Sept. 12, 1933. C. T. McGILL 1,926,953
PROCESS AND APPARATUS FOR TREATING BOILER WATER
Filed Oct. 20, 1928 4 Sheets-Sheet 4
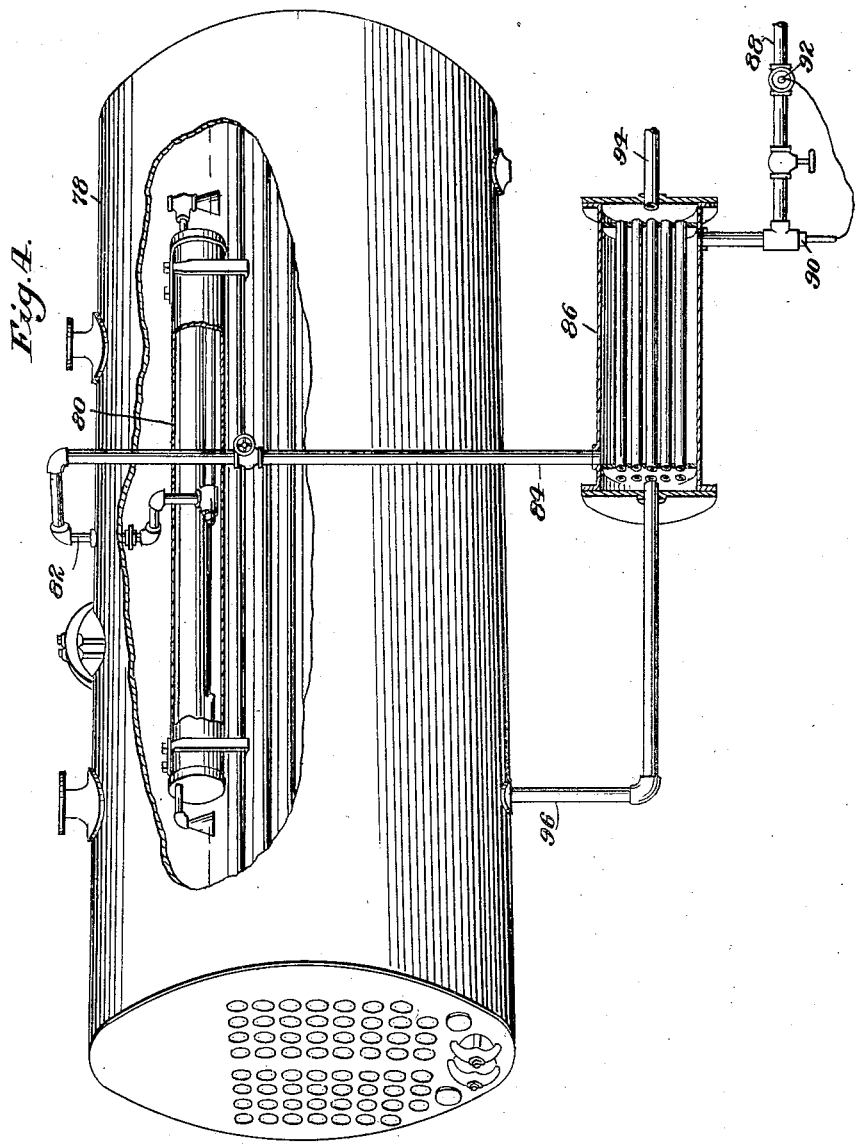
Inventor:
Chester T. McGill,
Conway T. Coe
Att'y.

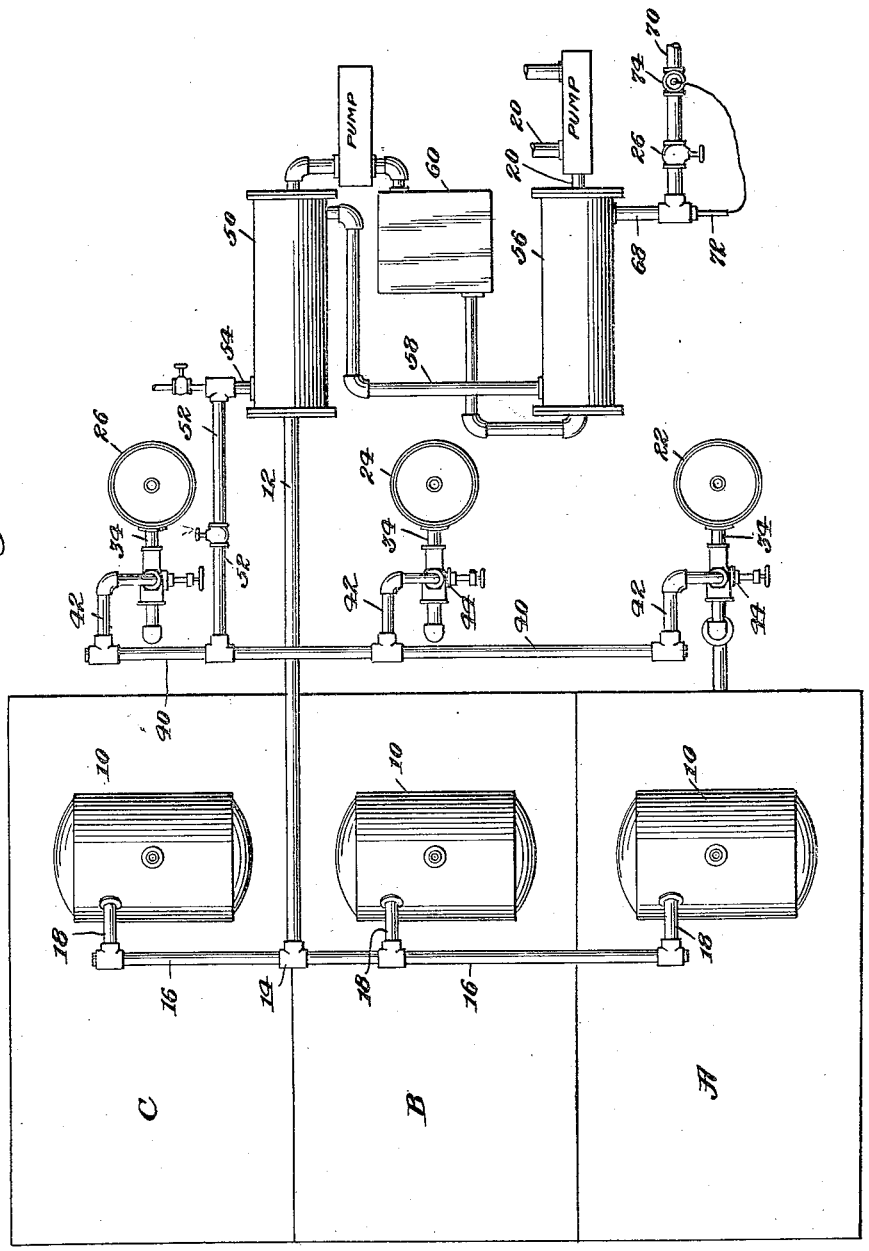

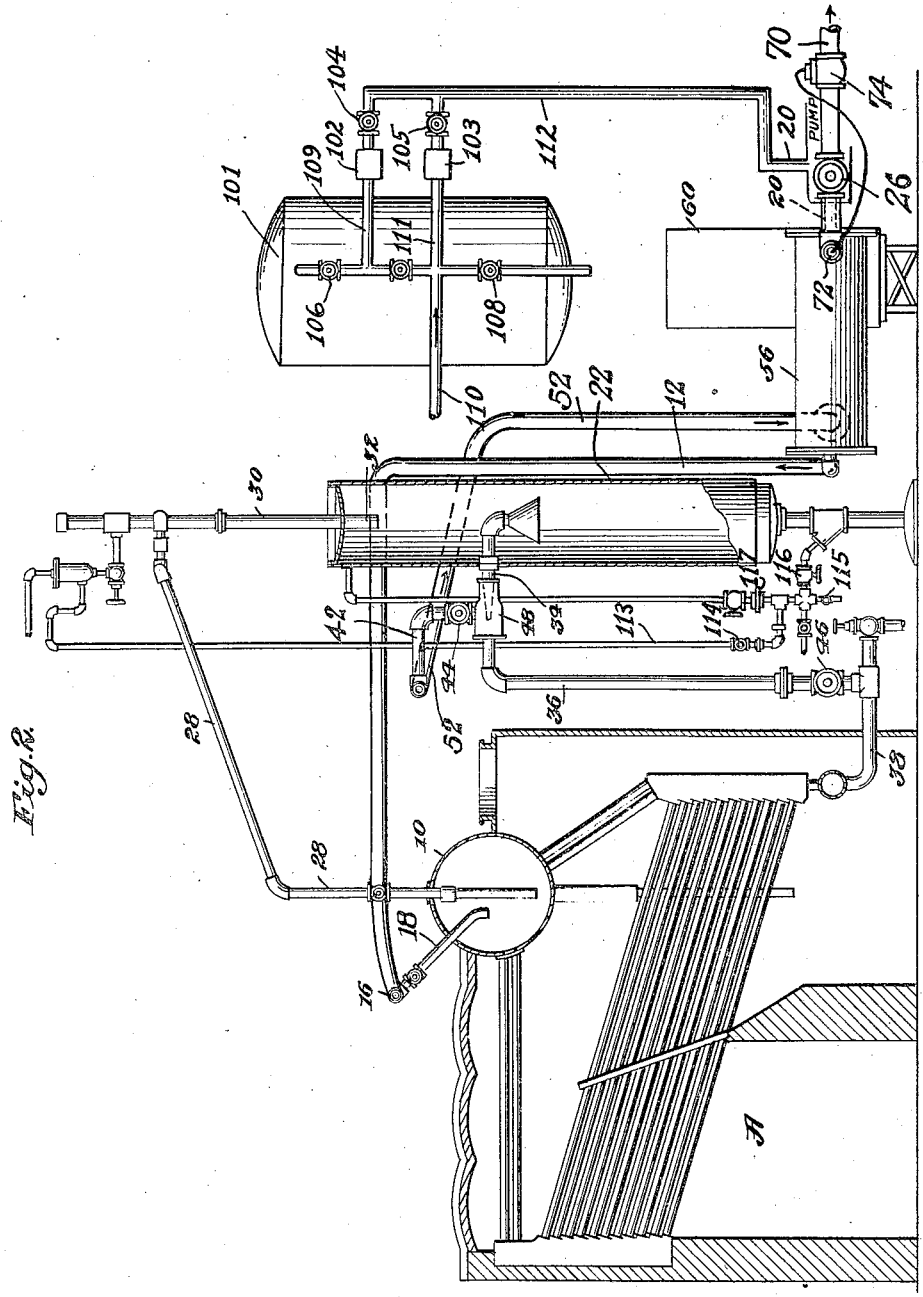

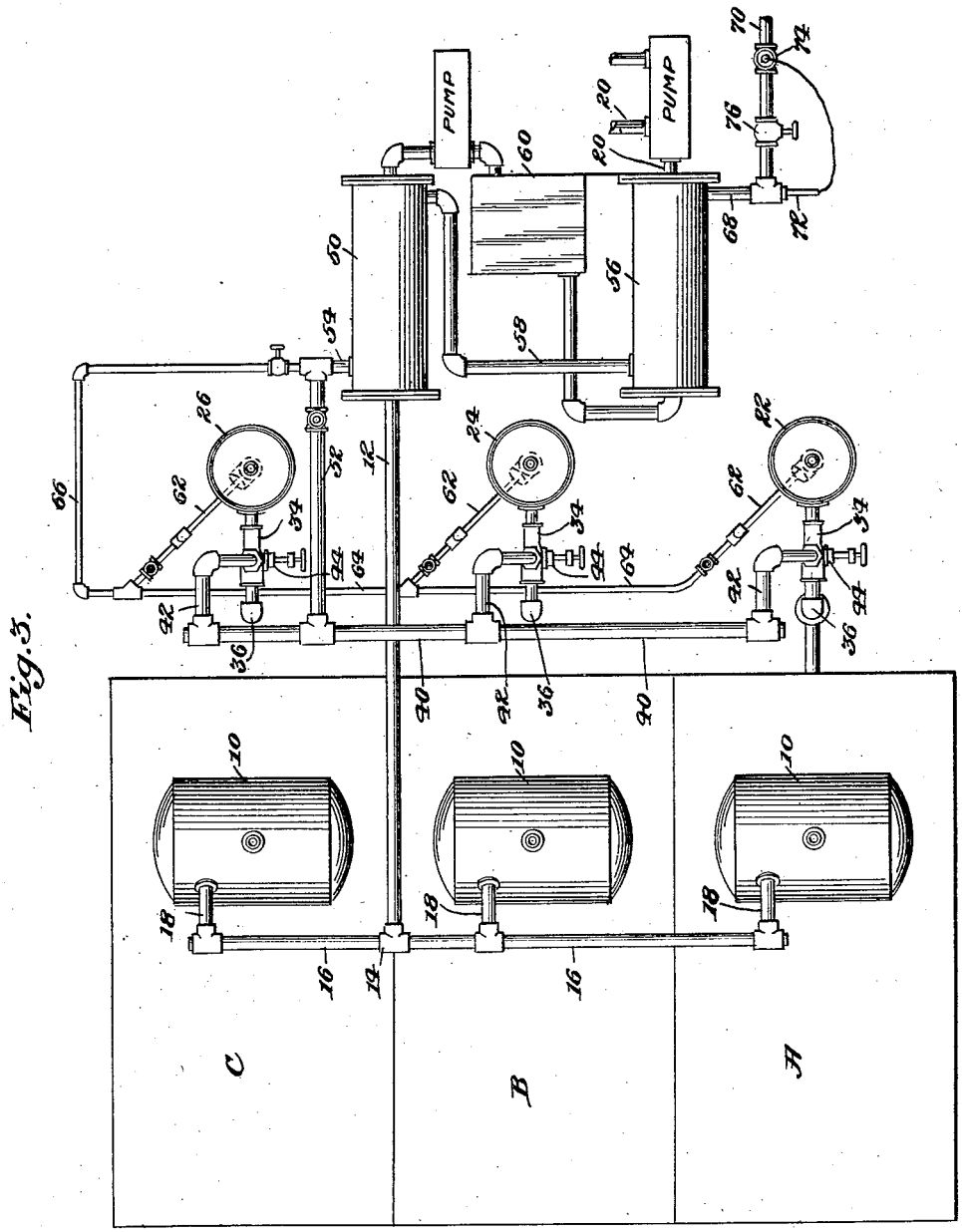

Patented Sept. 12, 1933

1,926,953

UNITED STATES PATENT OFFICE 1,926,953

PROCESS AND APPARATUS FOR TREATING BOILER WATER

Chester T. McGill, Elgin, Ill.

Application October 20, 1928. Serial No. 313,724

9 Claims. (Cl. 122—403)

This invention relates to water softening apparatus and has particular reference to apparatus for conditioning and softening water for use in boilers.

The invention constitutes an improvement and refinement over the process and apparatus disclosed and claimed in my pending application, Serial Number 216,317, filed August 29, 1927, which has matured into Patent No. 1,742,714 and is, in effect, a continuation in part thereof. In the application referred to, I previously proposed a novel method of conditioning and softening water which comprised initially dividing the raw water supply into two distinct streams, one of which was passed directly into the boiler in an unsoftened and untreated condition, and the other passed through a suitable softening apparatus, such for example, as a standard zeolite softener. Under the influence of pressure and heat conditions within the boiler, the chemical combination of the raw water and the softened water results in a neutralization of the scale-forming solids existing in the raw water and a precipitation of such solids from the water. The precipitated solids were disposed of in my former process by a deconcentrator which functioned to mechanically collect and remove the same, thus removing such solids entirely from the system and preventing incrustation and clogging of the boiler tubes and associated parts of the apparatus. The process described is complicated when applied to a battery of boilers wherein the proper chemical balance cannot be uniformly maintained, owing to a variation in demands placed upon each boiler, and the inability to always properly and accurately proportion the amounts of raw and softened water in each boiler. One method of handling this situation was incorporated in my former process, and briefly stated is as follows: The water in each of the boilers is periodically tested to determine the chemical condition of the water with respect to hardness, alkalinity, the excess quantity of softening agents, and the presence of oil. In accordance with the condition existing in an individual boiler as indicated by these tests, it was proposed to add to the boiler or boilers departing from the normal desired condition such chemical reagents as would restore the particular abnormal boiler or boilers to proper condition. Thus, to an undersoftened boiler, a suitable concentrated softening reagent was added; to a boiler in which such an excess of oil was present as to cause emulsification, a coagulant was injected in such quantities as to break down the oily binder and permit the semi-soluble material held thereby to precipitate from the water into a floc, and be removed subsequently by the mechanical deconcentrator; to the oversoftened boiler, the proportionate amount of raw water was so increased as to bring the softening reagents down to the proper proportion. The process briefly referred to above and fully described in my pending application constitutes a marked advancement over previous processes and has enjoyed noteworthy commercial success. While generally this method has proven entirely satisfactory in the treatment and conditioning of boiler water, its use is accompanied by several disadvantages. It requires the use of a substantial amount of added chemicals and demands an elaborate mechanical installation.

The present invention has for its general object to improve the former process by the elimination of unnecessary or excessive quantities of softening agents added to the boiler and the simplification of the installation. By the present invention, the chemical balance between and in a battery of boilers is maintained, not primarily by the addition of a chemical reagent in the manner of the old process, but by a shifting of a portion of the water from ore boiler to another to correct an abnormal condition in each.

A further object is to reduce the blow-down losses to a minimum by the use of a heat exchanger. I am aware that it is old in boiler practice to apply a heat exchanger to the discharged water and utilize the heat thus obtained to preheat the incoming makeup water. However, insofar as I am aware, it has heretofore been the practice to apply such heat exchangers directly to the boiler proper or, in other words, to pass the discharged blow-off water directly from the boiler through the heat exchanger. When this is done, and regardless of the specific preliminary softening and treating operations, the suspended and precipitated solids in the boiler water are carried through the heat exchanger and cause the passages and walls of the latter to become coated and clogged with sludge and oil binders, thereby materially decreasing the efficiency of the heat exchangers.

The present invention contemplates the withdrawal of the water during a blown-down of the system, either from the deconcentrator or between the deconcentrator and the return pipe to the boiler, depending upon the nature of the chemical ingredients of the raw water.

These and other objects of the invention will appear more fully from the following specification when read in connection with the accompanying drawings and will be pointed out in the appended claims.

In the drawings:

Fig. 1 is a diagrammatic plan view of one form of the invention;

Fig. 2 is an end view partly in section;

Fig. 3 is a diagrammatic plan of a modified installation; and

Fig. 4 is a perspective view of a further modification, parts being broken away to illustrate the internal construction.

Referring more particularly to Figs. 1 and 2 of the drawings, the reference characters A, B and C indicate steam boilers arranged in battery formation and capable of developing steam for a turbine, engine, or other power mechanism. The boilers may be of any standard construction, the type shown being the well-known cross drum water tube boiler. Each boiler includes a steam drum 10 which receives its feed water supply from an inlet pipe 12 connected at 14 to a cross pipe 16 from which the inlet pipes 18 extend into the drums.

The preliminary method of treating and conditioning the incoming makeup water is preferably the same employed in my pending application, Serial No. 216,317 and for a detail description of such conditioning operations, reference may be had to that application. As shown in Fig. 2 of the drawings, a water softening tank 101 is provided, this type of tank being well known. The raw water enters the pipe 110, passes through the valve 108 to the tank 101, out of the tank through valve 106, through pipe 109, regulating device 102 and valve 104 to the pipe 112. The raw water which is not to be softened passes from line 110 through pipe 111 and proportioner 103 through valve 105 and pipe 112. It is obvious that any desired proportion of the raw water may be softened before being passed to the feed pipe 20, and that the two types of water may be mixed in any desired proportions. After such preliminary treatment, the conditioned water is conducted by a pipe 20 through preheaters and thence by way of the main inlet pipe into the various boilers.

Associated with each of the boilers is a deconcentrator 22, 24 and 26 preferably of the type disclosed in my prior Patent No. 1,593,700. Water in a boiler is delivered to its associated deconcentrator by means of a pipe 28 which connects with a vertical pipe 30, the lower end 32 of which extends through the top of the deconcentrator. A return conduit formed by the pipes 34, 36 and 38 conducts the water from the deconcentrator back to the boiler. As it does not form per se an essential part of the present invention, the construction and detail operation of the deconcentrator need not be given. The deconcentrators serve to mechanically remove from the water precipitated and suspended solids developed by chemical reaction between the treated and untreated water under temperature and pressure within the boiler. Considered as an individual unit, the preliminary conditioning described and the mechanical separation of the precipitated and suspended solids would serve to prepare and maintain the water in an individual boiler in proper condition as it would be possible to control the proportionate amounts of the softened and unsoftened water.

Complications develop when a plurality of boilers are assembled in a battery in the manner illustrated in the present drawings. Owing to variations in service conditions and the demands placed upon each individual boiler, the chemical balance is maintained with difficulty. Thus, the water in boiler A may become highly oversoftened, while at the same time the water in boiler B is undersoftened. Obviously this condition could not be controlled or corrected by varying the proportion between the raw and the softened water as would be the case with a single boiler. To decrease the amount of raw water to correct the oversoftening of boiler A would merely aggravate the undersoftened condition existing in boiler B. To meet the condition referred to, the pipes 34 in the return line from the deconcentrators are connected to each other by means of the pipe 40 which joins with the return line through the pipe connections 42. Each of the connecting pipes 42 is provided with suitable hand valves 44 for controlling the passage of the water and additional hand valves 46 are provided in the pipes 36 of the return conduit. Through the arrangement described a connection may be established between the several boilers whereby the water in one may be caused to flow into each of the others. To promote the circulation of water from one boiler to the other, any suitable water circulating means may be provided, such for example as a suction ejection nozzle 48 located in the pipe 34 adjacent the point of union with the pipe 42. Assuming that under existing conditions it is desired to pass a portion of the water in boiler A into boiler B, the valves 44 in the pipes 42 connecting to the respective boiler systems are opened. The valve 46 in the boiler circuit A is partially closed to create a resistance in the flow of water in that line. The return of the water to the boiler B from its associated deconcentrator creates a suction through the injection nozzle 48 and causes a syphoning effect which draws the water from the boiler A through valve 44, line 42 of boiler A into conduit 40 and thence through line 42, valve 44, suction 48, line 36, valve 46, line 38, into boiler B. By a suitable manipulation of the valves 44 and 46, each boiler in the battery may be selectively connected as desired to the others and a distribution of the water from one to the other can be readily accomplished. Again assuming that the water in boiler A is overtreated and the water in boiler B is undertreated, by an adjustment of the valves in the manner described, the overtreated water in boiler A may be caused to pass into boiler B until the water in the latter boiler has been raised to the proper chemical balance, at which time the connection between the boilers may be closed. On the other hand, if the water in boiler A is undertreated and the water in boiler B is overtreated, the water from the former may be caused to pass into the latter and the overtreated condition remedied by a neutralization of the softening agents in the boiler by the chemical reaction with the hard water of the undertreated boiler.

Again, if the water in boilers A and B is substantially normal and that in boiler C is greatly oversoftened, the oversoftened water in boiler C is distributed into each of the other boilers. At the same time, the amount of incoming raw water is increased to balance the additional softening reagents which the normal boilers have obtained from the overtreated boiler. It is thus possible to effectively maintain the proper chemical balance in each of the units of the battery.

Even though the water in the boilers is initially conditioned, and the chemical balance in each boiler maintained and the precipitated injurious solids removed by the deconcentrator, it is nevertheless necessary to blow-down the boilers at intervals in order to remedy a condition which cannot be avoided when the makeup water consists of a high proportion of calcium sulphate and other insoluble ingredients. To obtain a proper chemical balance in the water, there must be a definite ratio between the sodium sulphate contents and the sodium hydroxide in the boiler water. If the ratio between these ingredients is not properly proportioned, caustic embrittlement develops. By virtue of my ability to transfer the water from one boiler to another, it is possible to hold the causticity to a minimum degree and by so doing, I am enabled to lower the amount of sodium sulphate to a proportionate degree, at the same time maintaining the proper ratio between the sodium sulphate and sodium hydroxide. Although the sodium sulphate is necessary in such an amount as will establish the proper ratio with respect to sodium hydroxide, an excess of soluble salts is undesirable because it results in moist and wet steam and ultimately foaming. Whenever such a high concentration of soluble salts exists as would create the undesirable conditions referred to, I resort to a blow-down of the water to remove such excess from the system.

The water to be tested may be drawn from a variety of points in the apparatus. As shown in Fig. 2, water may be drawn through the cock 115 from the pipes controlled by the valves 114, 116, or 117. In addition, the water being discharged through pipe 70 may likewise be tested.

Having reduced the number and frequency of blow-downs to a minimum, there remains the further problem of minimizing the loss resulting from the forced blow-downs required to maintain the desired low concentration of insoluble salts. One method of accomplishing this result is illustrated in Fig. 1. The pipe 34 in the return line from each of the deconcentrators to its associated boiler is connected to a heat exchanger 50 by means of pipes 42, 40, 52 and 54. A second heat exchanger 56 is connected by means of the pipe 58 to the first exchanger, such exchangers being located upon opposite sides of an opened or closed heater 60. The arrangement is such that the heat exchanger 56 will act upon the raw supply water entering the system and will elevate the temperature thereof prior to its entry into the heater 60. After passing through the latter heater, the temperature of the incoming water is further elevated by its passage through the heat exchanger 50. In this manner the highly heated blow-down water discharged in the blow-down operation is effectively utilized to heat the incoming makeup water. It should be noted that in the embodiment of the invention illustrated in Fig. 1, the blow-down water is taken from the system at a point in the return line between the deconcentrator and the boilers and at such point it has been substantially freed from suspended solids by the deconcentrators. Therefore, insofar as suspended solids are concerned, the blow-down water is substantially free from any matter which would cause a clogging and incrustation of the pipes of the heat exchangers. This arrangement is desirable especially where the makeup water is high in temporary hardness, or contains a high percentage of suspended solids, and when substantial amounts of oil have accumulated in the boilers, as the deconcentrators will remove the precipitated solids and the oil from the water, such removal being necessary if the water is to be subsequently passed through the heat exchangers without decreasing the efficiency of the latter.

Under certain conditions where the suspended matter and oil are not so predominant, the blow-down water may be taken directly from the deconcentrator in the manner illustrated in Fig. 3. In this arrangement, each deconcentrator is connected at the top or bottom or both by means of a pipe line 62 joined to a conduit 64, one end of which is connected by 66 to pipe 54 of the heat exchanger 50. With such a connection, the blow-down water and the deconcentrator accumulations are removed by a single operation. Thus, at one time a disposition is made of the excess soluble salts and the accumulated precipitated solids removed in the deconcentrator. It is important to observe that the arrangement illustrated in Fig. 3 is utilized mainly where the raw water is high in sodium content and low in temporary hardness and wherein there will be a comparatively small amount of suspended solids. Therefore, while the deconcentrator accumulations are passed through the heat exchangers, the latter will not become incrusted or seriously decrease in efficiency because of the proportionately small amounts of the suspended solids. The deconcentrators may participate individually in the blow-down operation or several may be connected at once and the blow-down operation may be either periodically or continuously. In either event, the blow-down operation is controlled through the temperature of the blow-down water as it leaves the heat exchanger 56. A water discharge pipe 68 is tapped through the casing of the heat exchanger 56 and connects with a pipe 70 leading to a convenient sewer or drain. Within the pipe 68 a thermostatic element 72 is arranged, suitable connections being made from the thermostat to a control valve 74 provided in the waste pipe 70. The thermostatic element is responsive to the temperature condition of the blow-down water in the heat exchanger and functions to close the discharging valve 74 when such temperature is above a predetermined point. The particular location of the thermostatic element is not important, it beeing apparent that it may be placed within the heat exchanger at a point near the discharge with substantially the same results. To entirely prevent the blow-down operation, a suitable hand valve 76 may be placed in the discharge pipe 70.

Fig. 4 illustrates an application of the invention to a boiler having an internal deconcentrator of the type used on movable conveyances, such as locomotives, cranes, and steam shovels, where conservation of space is an important factor. The boiler 78 is provided with an internal deconcentrator 80 of the type shown in my Patent No. 1,704,989, issued March 12, 1929. The deconcentrator is connected with a blow-out pipe 82 which communicates by means of a pipe 84 with a heat exchanger 86. After passing through the heat exchanger, the blow-down water is discharged through a pipe 88 within which a suitable thermostat 90 may be inserted for controlling the valve 92. The boiler makeup water enters the heat exchanger at 94 and is carried by line 96 to the boiler. While with this arrangement undesirable amounts of precipitated solids will be forced through the heat exchanger, this objection may be minimized by blowing down an amount of water in excess of what would be required with an external deconcentrator, and in any event, the disadvantage of carrying some precipitated solids through the heat exchanger is more than offset by the advantage obtained through utilizing the heat of the blow-off water and by making the internal deconcentrator a continuous blow-down operation.

Having thus described my invention, what I claim as new and desire to secure by Letters Patent of the United States is:

1. A process for treating water for use in a battery of steam boilers which comprises softening the water prior to its introduction into the boilers, periodically testing the water in the boilers to determine a departure from a normal chemically balanced condition, and transferring at will water from one boiler to another of the battery in such a way as to restore the chemical balance between the boilers when such tests indicate a departure therefrom.

2. A process for treating water for use in a battery of steam boilers which comprises softening the water prior to its introduction into the boilers, periodically testing the water in each boiler to determine the softness thereof with respect to a standard normal condition and to determine the variation of each boiler from such standard condition, and subsequently transferring at will water from one boiler to another in such a way as to restore the water within said boilers to said standard normal condition when such tests indicate a departure therefrom.

3. That improvement in the process of conditioning water for use in steam boilers which consists in periodically testing the water in each boiler to determine the chemical condition thereof as compared with a normal standard chemically balanced condition, and transferring at will water from one boiler to another in such a way as to restore the water in a particular boiler to said normal standard condition when such tests indicate a departure therefrom.

4. That improvement in the process of conditioning water for use in steam boilers which consists in periodically testing the water in each boiler to determine the chemical condition thereof as compared with a normal standard chemically balanced condition and continuously removing precipitated solids resulting from the reaction in the boiler of chemically different waters, and transferring at will boiler water from one boiler to another in such a way as to maintain said normal standard condition in the boiler water when such tests indicate a departure therefrom.

5. That improvement in the process of conditioning water for use in steam boilers which consists in passing the water in each boiler through a deconcentrator to remove precipitated solids resulting from the combination within the boiler of chemically different waters, testing the water in each boiler of the battery to detect any departures thereof from a standard chemically balanced condition, and subsequently and in accordance with the results of said tests transferring water from one boiler to the other to restore an unbalanced boiler water to a chemically balanced condition.

6. Apparatus of the character described having, in combination, a battery of steam boilers, means for feeding water to said boilers, pipe connections independent of said feeding means between said boilers for transferring water from one boiler to the others, without withdrawing any water from the boilers to which the water is transferred, means for promoting the flow of boiler water from one boiler to the others, and means in said connections for selectively controlling the transfer of water between the boilers.

7. A process of treating water of a boiler system having a battery of boilers which comprises separating from the water precipitated solids developed within the boiler, transferring at will water from one boiler to another to maintain a chemically balanced condition in the boilers, periodically discharging from the system after the solids have been separated such an amount of water as is necessary to remove any soluble impurities which are not required to maintain a chemically balanced condition in the boiler water, and passing the discharged water in heat exchange relation to the incoming make-up water while maintaining it separate therefrom.

8. Apparatus of the character described having, in combination, a battery of steam boilers, means for feeding water to said boilers, means independent of said feeding means between said boilers for transferring water from one boiler to the others without withdrawing any water from the boilers to which the water is transferred, means for promoting the flow of boiler water from one boiler to the others, means in said connections for selectively controlling the transfer of water between the boilers, a deconcentrator connected to each boiler, a heat exchanger associated with the incoming make-up water, and means for blowing down the boiler system, said means including a conduit for conducting the blowdown water from the deconcentrator to the heat exchanger.

9. Apparatus of the character described having, in combination, a battery of steam boilers, means for feeding water to said boilers, means independent of said feeding means between said boilers for transferring water from any one boiler to any other boiler in a closed circuit, means for promoting the flow of boiler water from one boiler to the other boilers and means in said second named means for selectively controlling transfer of water between the boilers.

CHESTER T. McGILL.